United States Patent
Suh et al.

(10) Patent No.: US 9,716,264 B2
(45) Date of Patent: Jul. 25, 2017

(54) ELECTRODE FOR LITHIUM SECONDARY BATTERY, METHOD OF MANUFACTURING THE ELECTRODE, AND LITHIUM SECONDARY BATTERY INCLUDING THE ELECTRODE

(75) Inventors: Soon-Sung Suh, Yongin-si (KR);
Sung-Hwan Moon, Yongin-si (KR);
Yury Matulevich, Yongin-si (KR);
Seung-Uk Kwon, Yongin-si (KR);
Yo-Han Park, Yongin-si (KR);
Chang-Ui Jeong, Yongin-si (KR);
Jae-Hyuk Kim, Yongin-si (KR);
Chun-Gyoo Lee, Yongin-si (KR);
Jong-Seo Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 455 days.

(21) Appl. No.: 13/593,468

(22) Filed: Aug. 23, 2012

(65) Prior Publication Data
US 2013/0216912 A1     Aug. 22, 2013

Related U.S. Application Data

(60) Provisional application No. 61/601,420, filed on Feb. 21, 2012.

(51) Int. Cl.
*H01M 4/134*     (2010.01)
*H01M 4/1395*     (2010.01)
(Continued)

(52) U.S. Cl.
CPC ......... *H01M 4/1395* (2013.01); *H01M 4/386* (2013.01); *H01M 10/0525* (2013.01); *H01M 2004/021* (2013.01)

(58) Field of Classification Search
CPC .............. H01M 4/1395; H01M 4/386; H01M 2004/021; H01M 10/0525; Y02E 60/122
See application file for complete search history.

(56) References Cited

U.S. PATENT DOCUMENTS

| | | | |
|---|---|---|---|
| 6,432,585 B1 | 8/2002 | Kawakami et al. | |
| 7,888,168 B2 | 2/2011 | Weidman et al. | |

(Continued)

FOREIGN PATENT DOCUMENTS

| | | |
|---|---|---|
| CN | 1194472 A | 9/1998 |
| CN | 102255075 A | 11/2011 |

(Continued)

OTHER PUBLICATIONS

EPO Search Report dated Jul. 2, 2013, for corresponding European Patent application 13156207.6, (6 pages).

(Continued)

*Primary Examiner* — Cynthia K Walls
(74) *Attorney, Agent, or Firm* — Lewis Roca Rothgerber Christie LLP

(57) ABSTRACT

An electrode for a lithium secondary battery includes a silicon-based alloy, and has a surface roughness of about 1 to about 10 μm and a surface roughness deviation of 5 μm or less. A method of manufacturing the electrode includes mixing an electrode composition, milling the composition, coating the milled composition on a current collector, and drying the milled composition. A lithium secondary battery includes the electrode.

6 Claims, 5 Drawing Sheets

ELECTROLYTIC SOLUTION

A

ELECTROLYTIC SOLUTION

B

(51) Int. Cl.
*H01M 4/38* (2006.01)
*H01M 10/0525* (2010.01)
*H01M 4/02* (2006.01)

(56) References Cited

U.S. PATENT DOCUMENTS

| | | |
|---|---|---|
| 2004/0062991 A1 | 4/2004 | Fukui et al. |
| 2005/0031957 A1 | 2/2005 | Christensen et al. |
| 2005/0069775 A1 | 3/2005 | Hwang et al. |
| 2005/0208379 A1 | 9/2005 | Musha et al. |
| 2005/0221189 A1* | 10/2005 | Yoshida et al. .......... 429/231.95 |
| 2006/0105242 A1* | 5/2006 | Sato et al. ............... 429/231.95 |
| 2007/0128517 A1 | 6/2007 | Christensen et al. |
| 2012/0052388 A1* | 3/2012 | Jung et al. ................ 429/218.1 |
| 2012/0264015 A1* | 10/2012 | Jung .................... H01M 4/134 429/211 |
| 2013/0130101 A1* | 5/2013 | Kim et al. .................... 429/188 |

FOREIGN PATENT DOCUMENTS

| | | | |
|---|---|---|---|
| JP | 2004-127535 A | 4/2004 | |
| JP | 2005-11699 A | 1/2005 | |
| JP | 2007-220451 A | 8/2007 | |
| JP | 2009-117165 A | 5/2009 | |
| KR | 10-2005-0030440 | 3/2005 | |
| KR | 10-2005-0069989 | 7/2005 | |
| KR | 10-2006-0045145 | 5/2006 | |
| KR | 10-2008-0066234 A | 7/2008 | |
| KR | 10-2010-0125448 | 11/2010 | |
| KR | 2012012265 * | 2/2012 | ............. H01M 4/38 |
| WO | WO 2007/064531 A1 | 6/2007 | |
| WO | WO 2011/155770 * | 12/2011 | .......... H01M 10/052 |

OTHER PUBLICATIONS

Machine English Translation of JP 2009-117165 A, 35 pages.
SIPO Office action dated Feb. 2, 2016, with English translation, for corresponding Chinese Patent application 201310045515.9, (22 pages).
SIPO Office Action dated Sep. 27, 2016, with English translation, for corresponding Chinese Patent Application No. 201310045515.9 (20 pages).
JPO Office Action dated Dec. 20, 2016, for corresponding Japanese Patent Application No. 2013-031628 (4 pages).

* cited by examiner

ELECTRODE FOR LITHIUM SECONDARY BATTERY, METHOD OF MANUFACTURING THE ELECTRODE, AND LITHIUM SECONDARY BATTERY INCLUDING THE ELECTRODE

CROSS-REFERENCE TO RELATED APPLICATION

This application claims priority to and the benefit of U.S. Provisional Application No. 61/601,420, filed on Feb. 21, 2012 in the U.S. Patent and Trademark Office, the entire content of which is incorporated herein by reference

BACKGROUND

Technical Field

The present invention relates to an electrode for a lithium secondary battery, a method of manufacturing the electrode, and a lithium secondary battery including the electrode.

Description of Related Art

Lithium secondary batteries that are attractive for use as power sources for small and portable electronic devices use organic electrolytic solutions. Due to the use of organic electrolytic solutions, lithium secondary batteries have a discharge voltage that is two or more times greater than that of a typical battery using an alkali aqueous solution, and thus lithium secondary batteries have high energy densities.

The positive and negative electrodes of a lithium secondary battery include materials that enable intercalation and deintercalation of lithium ions, and the space between the positive and negative electrodes is filled with an organic electrolytic solution or a polymer electrolytic solution. Electric energy is generated by oxidation and reduction reactions occurring when lithium ions are intercalated into or deintercalated from the positive electrode and the negative electrode.

Although such lithium secondary batteries have good battery properties including high electromotive force and high energy density, developments in industry require batteries having longer lifespan characteristics.

SUMMARY

According to embodiments of the present invention, an electrode for a lithium secondary battery has improved lifespan characteristics. Other embodiments are directed to a method of manufacturing the electrode.

Another embodiment of the present invention provides a lithium secondary battery including the electrode.

According to one or more embodiments of the present invention, an electrode for a lithium secondary battery includes a silicon-based alloy and has a surface roughness of about 1 to about 10 μm, and a surface roughness deviation of 5 μm or less.

According to one or more embodiments of the present invention, a method of manufacturing an electrode includes preparing a composition for forming an electrode active material layer by adding an active material, a conductive material, and a binder to a solvent, followed by wet mixing and milling; and coating and drying the composition on a current collector.

According to one or more embodiments of the present invention, a lithium secondary battery includes the electrode described above.

According to embodiments of the present invention, electrodes for a lithium secondary battery are efficiently impregnated with an electrolytic solution and thus, lithium secondary batteries including such electrodes have improved efficiency, capacity retention rates and lifespan characteristics.

DETAILED DESCRIPTION

Figure 1:
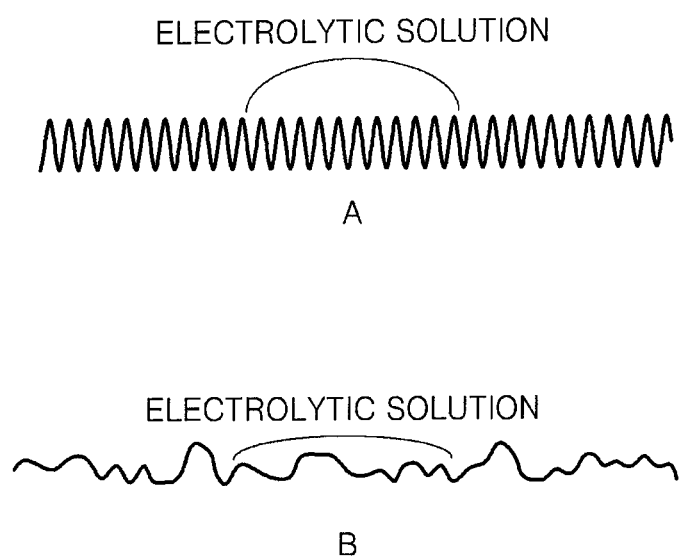
FIG. 1 is a diagram explaining the electrolytic solution impregnation property of a negative electrode according to an embodiment of the present invention.

An electrode for a lithium secondary battery, according to an embodiment of the present invention, includes a silicon-based alloy, and has a surface roughness of about 1 to about 10 μm, and a surface roughness deviation of 5 μm or less.

Silicon-based alloys can be used as electrode active materials, but to obtain high capacity, silicon-based alloys having high silicon content are used. When electrodes are manufactured using such silicon-based alloys containing high silicon content, the crystal size of the silicon-based alloy increases and thus, the formed electrode may have a surface roughness of greater than 10 μm. Thus, the electrolytic solution impregnation property with respect to the electrode is reduced, causing a solid electrolyte interface (SEI) to be continuously formed on the surface of the electrode when the silicon volumetrically expands. Consequently, a lithium secondary battery employing the electrode may have decreased initial efficiency, and a substantially decreased capacity retention rate (C.R.R). As a result, the lithium secondary battery may have a decreased lifespan.

In contrast, the electrodes according to embodiments of the present invention have an appropriately controlled silicon content and mixed ratio of active silicon to inactive silicon in the silicon-based alloy. In addition, according to some embodiments of the present invention, optimum mixing and milling conditions of the silicon-based alloy, binder, and conductive material yield a formed electrode having a surface roughness of 1 to 10 μm and a surface roughness deviation of 5 μm or less.

The amount of silicon in the silicon-based alloy may be about 60 to about 72 atom %. If the amount of the silicon in the silicon-based alloy is within this range, electrodes using the silicon-based alloy may have good surface roughness and roughness deviation characteristics.

The silicon of the silicon-based alloy may contain inactive silicon and active silicon, which are mixed. The active silicon may directly affect the capacity of the silicon-based alloy, and the inactive silicon may have an inactive matrix structure and may suppress volumetric expansion of the silicon-based alloy.

The amount of active silicon may be about 40 to about 80 atom % based on 100 atom % of the total amount of the active silicon and the inactive silicon in the silicon-based alloy. If the amount of active silicon is within this range, when an electrode including the active silicon is charged and discharged, volumetric expansion of the silicon-based alloy may be efficiently suppressed and the electrode may have good capacity characteristics.

The silicon-based alloy has silicon particles dispersed within a silicon alloy-based matrix. Due to the structure and composition of the silicon-based alloy, when the silicon particles expand during charging and discharging, the silicon alloy-based matrix surrounding the silicon particles may efficiently control the volumetric change in the silicon. Accordingly, when the silicon-based alloy is used as a negative active material, the expansion ratio of an electrode using the silicon-based alloy may be reduced during charging and discharging.

As described above, due to the decrease in the expansion ratio of an electrode during charging and discharging, problems resulting from the expansion of the electrode (that is, decreased lifespan characteristics resulting from an increased irreversible capacity of lithium due to the formation of an additional SEI film occurring when the silicon alloy-based matrix is destroyed) may be substantially prevented.

Also, the formed electrode may have the surface roughness and surface roughness deviation characteristics described above, and thus, the initial electrolytic solution impregnation property may be improved, and deviations resulting from a local overpotential may be reduced. Thus, lifespan may be improved, and the battery manufacture yield may be increased.

An electrode for a lithium secondary battery, according to an embodiment of the present invention, is described below with reference to FIG. 1.

Referring to FIG. 1, A depicts an electrode having a substantially uniform surface roughness, and B depicts an electrode with a surface roughness deviation that is greater than that of the electrode of A.

Referring to FIG. 1, when the roughness of the electrode is uniformly controlled, as illustrated in A, the specific surface area of the electrode surface is increased, and thus, the impregnation characteristics of the electrolytic solution are improved. When the impregnation characteristics of the electrolytic solution are improved, the silicon alloy matrix substantially suppresses the formation of a SEI film, and thus, expansion of the negative electrode including the silicon alloy-based material after charging and discharging may be effectively suppressed.

When expansion after charging and discharging is effectively suppressed in the electrodes, as described above, lithium batteries formed using the electrodes may have improved initial efficiency, capacity retention rates, and lifespan characteristics.

The electrode may have a roughness standard deviation of, for example, 2 μm or less, for example, about 0.1 to about 2 μm.

The term "surface roughness," as used herein, refers to an evaluation of the levels or amount of pin holes or protrusions, mixed impurities, cracks, strip patterns, lumps, etc., and refers to a surface roughness arithmetical mean value of the electrode.

According to embodiments of the present invention, the electrode may have a mixed density of about 0.80 to about 0.90 g/cc.

The "mixed density" is calculated by dividing the weight of the components of the electrode (other than the current collector, i.e., active material, conductive material, binder, etc.) by the volume of the electrode.

When the mixed density of the electrode is within the above range, the surface roughness characteristics of the electrode are controlled within an appropriate range. Thus, when an electrode having such surface roughness characteristics is employed, the lifespan of the formed lithium secondary battery may be improved.

The silicon-based alloy may include silicon, and one or more metals selected from aluminum (Al), nickel (Ni), iron (Fe), manganese (Mn), and titanium (Ti).

The silicon-based alloy may be represented by, for example, silicon-M-A. In this formula, M and A are different from each other, and M may be, for example, aluminum (Al), titanium (Ti), or iron (Fe), and A may be, for example, nickel (Ni), iron (Fe), or manganese (Mn).

The amount of silicon in the silicon-M-A alloy may be about 60 to about 72 atom %.

The amount of M in the silicon-M-A alloy may be about 7 to about 20 atom %, and an amount of A in the silicon-M-A alloy may be about 15 to about 20 atom %.

The silicon-based alloy may be, for example, $Si_{68}Al_8Ni_{24}$, $Si_{60}Ti_{20}Ni_{20}$, $Si_{70}Fe_{15}Mn_{15}$, $Si_{70}Al_{15}Fe_{15}$, $Si_{70}Al_{15}Mn_{15}$, $Si_{70}Ti_{15}Fe_{15}$, $Si_{65}Ti_{17.5}Ni_{17.5}$, or $Si_{68}Ti_{16}Ni_{16}$.

Some embodiments of the present invention are directed to a method of manufacturing an electrode for a lithium secondary battery. The electrode contains a silicon-based alloy.

The conditions used for mixing the silicon-based alloy, the conductive material, and the binder may significantly affect the surface roughness characteristics of the finally obtained electrode.

According to an embodiment of the present invention, a composition for forming an electrode active material layer may be prepared as described below. The composition includes a silicon-based alloy as an electrode active material, a conductive material, and a binder.

To mix the silicon-based alloy, conductive material, and binder of the composition for forming the electrode active material layer, a solvent is loaded into a milling machine to prepare a liquid condition, and then the active material, conductive material, and binder are added thereto, followed by mixing. The adding sequence of the active material, the conductive material, and the binder is not particularly limited, and for example, the active material may be added first followed by the conductive material and the binder. By doing this, pulverization of the active material into too small particles may be substantially suppressed.

The mixing of the active material, the conductive material, and the binder may be performed by wet mixing and milling in a liquid condition. Through the wet mixing and milling, oxidation of the active material, the conductive material, and the binder may be prevented, and also, the particle diameter of the active material may be controlled to be about 10 μm or less, for example, about 1 μm to about 7 μm. If the particle diameter of the active material is controlled within this range, problems resulting from the volumetric expansion of silicon-based particles during charging and discharging may be substantially prevented, and also, the surface characteristics of the active material may be optimized so that the surface of the active material is uniformly wetted with the electrolytic solution.

When the particle diameter of the active material is controlled to be 10 μm or less and the surface characteristics of the active material are controlled as described above, the formed electrode may have a surface roughness of about 1 μm to about 10 μm and a surface roughness deviation of about 5 μm or less. Thus, pulverization of the electrode active material into too small particles and damage to the electrode active material may be effectively suppressed during pressing (which is performed during manufacture of the electrode) and/or during charging and discharging of the lithium secondary battery employing the electrode.

The solvent may be N-methylpyrrolidone (NMP), pure water, or the like.

The amount of the solvent may be such that the solids content of the composition is about 30 to about 50 wt %. If the amount of the solvent is within this range, the particle diameter of the active material may be controlled to be 10 μm or less, and the components of the composition may have good dispersion properties, enabling the active material layer to be easily formed.

As a milling machine for wet mixing and milling, for example, a bead mill may be used. When a bead mill is used, the silicon-based alloy as an active material, the conductive material, and the binder are milled into appropriate particle sizes and are uniformly dispersed. Thus, the formed electrode may have good surface roughness characteristics.

If the particle diameter of the active material is controlled to be 10 μm or less as described above, pulverization of the silicon-based alloy active material into too small particles during charging and discharging and/or during pressing of the electrode may be substantially prevented.

The wet mixing and milling is performed using beads, and an average particle size of the beads may be, for example, about 0.5 to about 2 mm, and the revolutions per minute (rpm) of the milling machine may be, for example, about 1000 to about 2000 rpm. When the average diameter of the beads and the revolutions per minute of the mill are within these ranges, the prepared composition may have good dispersibility and pulverization of the active material into too small particles may be substantially prevented.

Non-limiting examples of materials for the beads include zirconia beads and alumina beads.

The resultant that has been subjected to the wet-mixing and milling is coated on an electrode current collector, and then dried and pressed to complete the manufacture of an electrode.

The drying may be performed at a temperature of about 100 to about 150° C., for example, about 100 to about 110° C.

The electrode active material may be, for example, a negative active material, and the electrode may be, for example, a negative electrode.

The negative active material may include, the silicon-based alloy described above, and may further include other negative active materials (i.e., a second active material), such as those typically used in lithium secondary batteries.

Non-limiting examples of suitable second negative active materials include materials capable of intercalating or deintercalating lithium ions, such as graphite, carbonaceous materials, such as carbon, lithium metal and alloys thereof, silicon oxide-based materials, mixtures thereof, and the like.

According to an embodiment of the present invention, the negative active material may include the silicon-based alloy and a carbonaceous material. The carbonaceous material may be graphite, or pitch (which is amorphous carbon).

When the carbonaceous material is used together with the silicon-based alloy as described above, oxidation of the silicon-based alloy is suppressed and a SEI film may be stably and effectively formed. Also, electric conductivity may be increased to further improve the charging and discharging characteristics of the lithium battery.

When the carbonaceous material is used, the carbonaceous material may be coated on a surface of the silicon-based alloy.

The amount of the second negative active material may be about 1 to about 99 parts by weight based on 100 parts by weight of the total amount of the silicon-based alloy and the second negative active material.

If the negative active material includes the silicon-based alloy as a major component, the amount of the silicon-based alloy may be, for example, about 95 to about 99 parts by weight based on 100 parts by weight of the total amount of the second negative active material and the silicon-based alloy. When graphite or pitch is used as the second negative active material, the graphite or pitch may be coated on the surface of the silicon-based alloy.

If the negative active material includes the silicon-based alloy as a minor component, the amount of the silicon-based alloy may be, for example, about 1 to about 5 parts by weight based on 100 parts by weight of the total amount of the second negative active material and the silicon-based alloy. When graphite or pitch is used as the second negative active material, the graphite or pitch may function as a buffer for the silicon-based alloy, and thus the lifespan of the formed electrode may be further increased.

The binder is used in an amount of about 1 to about 10 parts by weight based on 100 parts by weight (the total weight) of the negative active material. Non-limiting examples of the binder include polyvinylidenefluoride, polyvinylalcohol, carboxymethylcellulose (CMC), starch, hydroxypropylcellulose, regenerated cellulose, polyvinylpyrrolidone, polyamide imide, polyethylene, polypropylene, ethylene-propylene-diene terpolymer (EPDM), sulfonated EPDM, styrene butadiene rubber, fluoride rubber, and vinylidene fluoride copolymers having one or more functional groups selected from carboxyl groups, epoxy groups, hydroxyl groups, and carbonyl groups.

When the amount of the binder is within the above range, the binding force of the electrode active material with respect to the current collector is further enhanced, and thus, the electrode and resulting battery may have improved lifespan and stability.

The conductive material may be used in an amount of about 1 to about 10 parts by weight based on 100 parts by weight (the total weight) of the negative active material. When the amount of the conductive material is within this range, the formed electrode may have good conductivity characteristics.

The conductive material is not particularly limited and may be any one of various materials so long as it is conductive and does not cause any chemical change in the corresponding battery. Non-limiting examples thereof include graphite, such as natural or artificial graphite; carbonaceous materials, such as carbon black, acetylene black, Ketjen black, channel black, furnace black, lamp black, and thermal black; conductive fibers such as carbon fibers and metallic fibers; fluoride carbon; metal powders, such as aluminum or nickel powder; conductive whiskers such as zinc oxide and potassium titanate; conductive metal oxides such as titanium oxide; and conductive materials, such as polyphenylene derivatives.

The negative electrode current collector may have a thickness of, in general, about 3 to about 500 μm. The material for forming the negative electrode current collector is not particularly limited and may be any one of various materials so long as it is conductive and does not cause any chemical change in the corresponding battery.

Non-limiting examples of such a material include copper; stainless steel; aluminum, nickel; titanium; heat treated carbon; copper and stainless steel, each of which has a surface coated with carbon, nickel, titanium, or silver; and aluminum-cadmium alloys. Also, like the positive electrode current collector, the negative electrode current collector may have an uneven surface to increase the binding force with respect to the negative active material, and may be a film type, sheet type, foil type, net type, porous type, foam type, a non-woven fabric type, or the like.

Hereinafter, a method of manufacturing a lithium secondary battery using the negative electrode is described below in detail. A lithium secondary battery according to an embodiment of the present invention includes, for example, a positive electrode, a negative electrode, a lithium salt-containing non-aqueous electrolyte, and a separator.

First, a positive active material, a conductive material, a binder, and a solvent are mixed to prepare a composition for forming a positive active material layer, and the composition is coated on a current collector and dried to complete the manufacture of a positive electrode.

As the positive active material, any lithium transition metal oxide that is typically used in lithium secondary batteries may be used.

As the lithium transition metal oxide, at least one of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, a+b+c=1), $LiNi_{1-y}Co_yO_2(0\leq y<1)$, $LiCo_{1-y}Mn_yO_2(0\leq y<1)$, $LiNi_{1-y}Mn_yO_2(0\leq y<1)$, $LiMn_{2-z}Ni_zO_4(0<z<2)$, $LiMn_{2-z}Co_zO_4(0<z<2)$, $LiCoPO_4$, and $LiFePO_4$ may be used.

The binder and the conductive material may be the same as described above with respect to the negative electrode, and may be used in the same amount.

The solvent may be N-methylpyrrolidone, pure water, or the like.

The amount of the solvent may be about 1 to about 500 parts by weight based on 100 parts by weight of the positive active material. If the amount of the solvent is within this range, the active material layer may be easily formed.

The positive electrode current collector may have a thickness of about 3 to about 500 μm, and may be any one of various materials so long as it is conductive and does not cause any chemical change in the corresponding battery. Non-limiting examples of such a material include stainless steel; aluminum; nickel; titanium; heat treated carbon; aluminum and stainless steel, each of which has a surface coated with carbon, nickel, titanium, or silver; and aluminum-cadmium alloys. The positive electrode current collector may have an uneven surface to increase the binding force with respect to the positive active material, and may be a film type, a sheet type, a foil type, a net type, a porous type, a foam type, a non-woven fabric type, or the like.

A separator is positioned between the positive electrode and the negative electrode.

The separator may have a pore diameter of about 0.01 to about 10 μm, and a thickness of, in general, about 5 to about 300 μm. The separator may be formed of, for example, an olefin-based polymer, such as polypropylene, polyethylene, or the like; or a sheet or non-woven fabric formed of glass fiber. If the electrolyte is a solid electrolyte, such as a polymer, the solid electrolyte may also function as the separator.

The lithium salt-containing non-aqueous electrolyte may include a non-aqueous organic solvent and a lithium salt.

The non-aqueous electrolyte may be a non-aqueous electrolytic solution, an organic solid electrolyte, an inorganic solid electrolyte, or the like.

Non-limiting examples of the non-aqueous organic solvent include N-methyl-2-pyrrolidone, propylene carbonate, ethylene carbonate, butylene carbonate, dimethyl carbonate, diethyl carbonate, gamma-butyrolactone, 1,2-dimethoxy ethane, 2-methyl tetrahydrofuran, N,N-dimethylsulfoxide, 1,3-dioxolane, N,N-formamide, N,N-dimethylformamide, acetonitrile, nitromethane, methyl formate, methyl acetate, trimethyl phosphate, trimethoxy methane, 1,4-dioxolane, sulfolane, methyl sulfolane, 1,3-dimethyl-2-imidazolidinone, propylene carbonate, tetrahydrofuran, ether, methyl propionate, and ethyl propionate.

Non-limiting examples of the organic solid electrolyte include polyethylene, polyethylene oxides, polypropylene oxides, ester phosphate polymers, polyestersulfide, polyvinyl alcohol, and polyvinylidene fluoride.

Non-limiting examples of the inorganic solid electrolyte include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that is highly soluble in the non-aqueous organic solvent. Non-limiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3SO_2)_2NLi$.

Figure 2:
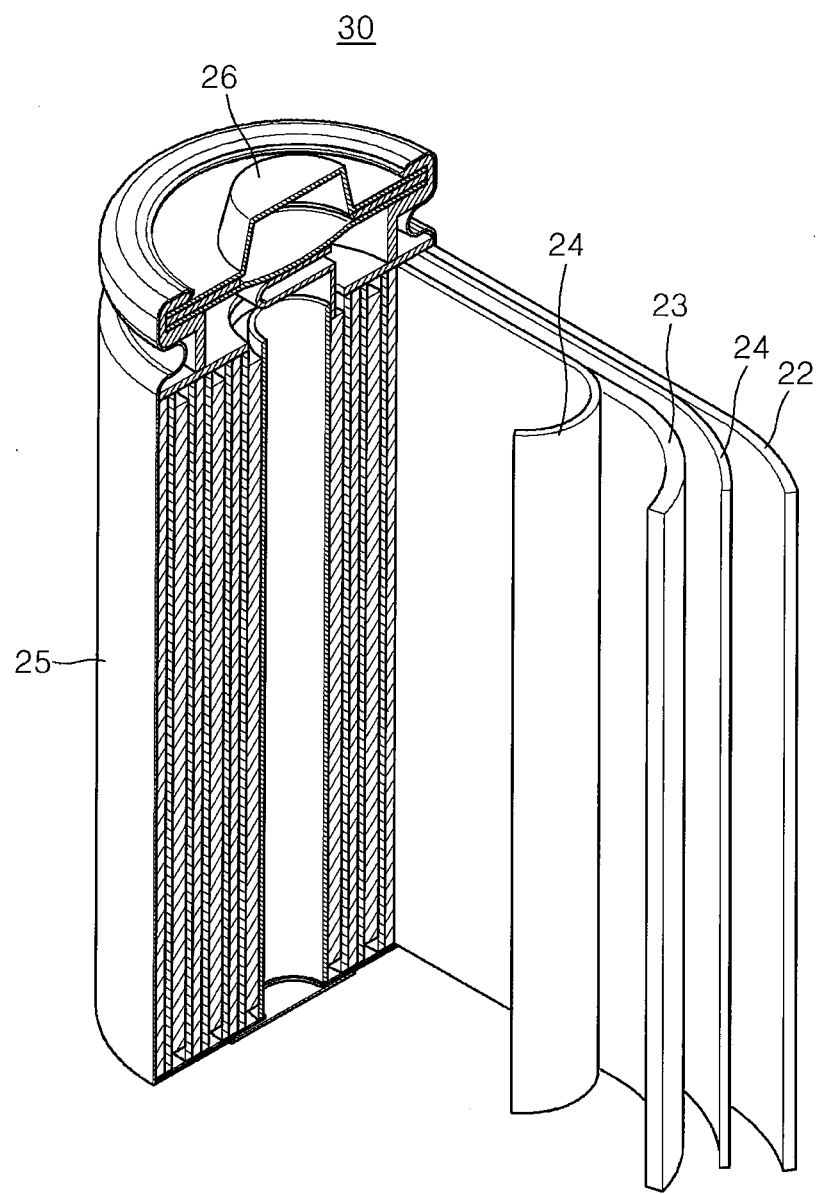
FIG. 2 is a cross-sectional perspective view of a lithium secondary battery according to an embodiment of the present invention.

FIG. 2 is a cross-sectional perspective view of a lithium secondary battery 30 according to an embodiment of the present invention.

Referring to FIG. 2, the lithium secondary battery 30 includes an electrode assembly including a positive electrode 23, a negative electrode 22, and a separator 24 disposed between the positive electrode 23 and the negative electrode 22. The electrode assembly is housed in a battery case 25, and sealed with an encapsulation member 26. An electrolyte (not shown) impregnates the positive electrode 23, the negative electrode 22, and the separator 24. The negative electrode 22 may be the negative electrode according to an embodiment of the present invention described above.

To manufacture the lithium secondary battery 30, the positive electrode 23, the negative electrode 22, and the separator 24 are sequentially stacked and then the stack is rolled in a jelly roll form and then placed in the battery case 25.

One or more embodiments of the present invention will now be described with reference to the following examples. However, the examples are presented for illustrative purposes only, and do not limit the scope of the present invention.

Example 1: Manufacture of Negative Electrode

NMP was loaded into a bead mill (LabStar manufactured by NETZSCH Company) to prepare a liquid condition. A silicon-based alloy ($Si_{68}Al_8Ni_{24}$ with a content of active silicon of about 79.4 atom %) as an active material, Ketjen black as a conductive material, and polyamide imide (PAI) as a binder were sequentially added thereto at a weight ratio of 88:4:8, and wet mixing and milling were performed thereon using the bead mill at a revolutions per minute of about 1000 rpm for about 30 minutes to prepare a composition for a negative active material layer. The beads employed by the bead mill had a diameter of about 0.5 mm, and NMP was used in an amount sufficient to yield a total solids content in the composition of 48 wt %.

The composition was coated on a copper foil to form a film having a thickness of about 14 µm, thereby forming a thin electrode. The thin electrode was dried at a temperature of about 135° C. for 3 or more hours, and then pressed, thereby completing the manufacture of a negative electrode.

Example 2: Manufacture of Negative Electrode

A negative electrode was manufactured in the same manner as Example 1, except that a $Si_{60}Ti_{20}Ni_{20}$ silicon-based alloy with a content of active silicon of about 41.7 atom % was used instead of the $Si_{68}Al_8Ni_{24}$ silicon-based alloy.

Example 3: Manufacture of Negative Electrode

A negative electrode was manufactured in the same manner as Example 1, except that the diameter of beads employed by the bead mill was about 2 mm, and the revolutions per minute of the bead mill was about 2000 rpm.

Example 4: Manufacture of Negative Electrode

A negative electrode was manufactured in the same manner as Example 1, except that the composition was prepared using a $Si_{65}Ti_{17.5}Ni_{17.5}$ silicon-based alloy with a content of active silicon of about 52.9 atom % instead of the $Si_{68}Al_8Ni_{24}$ silicon-based alloy.

Example 5: Manufacture of Negative Electrode

A negative electrode was manufactured in the same manner as Example 1, except that the composition was prepared using a $Si_{68}Ti_{16}Ni_{16}$ silicon-based alloy with a content of active silicon of about 58.8 atom % instead of the $Si_{68}Al_8Ni_{24}$ silicon-based alloy.

Comparative Example 1: Manufacture of Negative Electrode

A negative electrode was manufactured in the same manner as Example 1, except that the composition was prepared as follows.
A $Si_{68}Al_8Ni_{24}$ silicon-based alloy as an active material, Ketjen black as a conductive material, and PAI as a binder were loaded into a paint shaker at a weight ratio of 88:4:8, followed by 30 minutes of dry mixing. Then, NMP was added thereto and mixed with the dried product to complete the preparation of the composition.
The amount of NMP included in the composition was controlled such that the total solids content of the composition was 48 wt %.

Comparative Example 2: Manufacture of Negative Electrode

A negative electrode was manufactured in the same manner as Example 1, except that the composition was prepared as follows.
A $Si_{68}Al_8Ni_{24}$ silicon-based alloy as an active material, and Ketjen black as a conductive material were loaded into a Thinky mixer, followed by 30 minutes of dry mixing. Then, NMP and PAI as a binder were added thereto and mixed with the dried product. Then, the resultant was mixed using a bead mill for 30 minutes to complete the preparation of the composition.

The $Si_{68}Al_8Ni_{24}$ silicon-based alloy as the active material, Ketjen black as the conductive material, and PAI as the binder were mixed at a weight ratio of 88:4:8. The diameter of the beads employed by the bead mill was about 2 mm, and the revolutions per minute of the bead mill was about 2000 rpm. The amount of NMP included in the composition was controlled such that the total solids content of the composition was 48 wt %.

Comparative Example 3: Manufacture of Negative Electrode

A negative electrode was manufactured in the same manner as Example 1, except that the composition was prepared as follows.
A $Si_{68}Al_8Ni_{24}$ silicon-based alloy as an active material, and Ketjen black as a conductive material were loaded into a paint shaker, followed by 30 minutes of dry mixing. Then, NMP and PAI as a binder were added thereto and mixed with the dried product. Then, the resultant was mixed using a bead mill for 30 minutes to complete the preparation of the composition.
The $Si_{68}Al_8Ni_{24}$ silicon-based alloy as the active material, Ketjen black as the conductive material, and PAI as the binder were mixed at a weight ratio of 88:4:8. The diameter of the beads employed by the bead mill was about 2 mm, and the revolutions per minute of the bead mill was about 2000 rpm. The amount of NMP included in the composition was controlled such that the total solids content of the composition was 48 wt %.

Comparative Example 4: Manufacture of Negative Electrode

A negative electrode was manufactured in the same manner as Example 2, except that the composition was prepared as follows.
The silicon-based alloy as the active material, Ketjen black as the conductive material, and PAI as the binder were loaded into a paint shaker at a weight ratio of 88:4:8, followed by 30 minutes of dry mixing. Then, NMP was added thereto and mixed to complete the preparation of the composition.
The amount of NMP included in the composition was controlled such that the total solids content of the composition was 48 wt %.

Comparative Example 5: Manufacture of Negative Electrode

A negative electrode was manufactured in the same manner as Example 4, except that the composition was prepared as follows.
The silicon-based alloy as the active material, Ketjen black as the conductive material, and PAI as the binder were loaded into a paint shaker at a weight ratio of 88:4:8, followed by 30 minutes of dry mixing. Then, NMP was added thereto and mixed to complete the preparation of the composition.
The amount of NMP included in the composition was controlled such that the total solids content of the composition was 48 wt %.

Comparative Example 6: Manufacture of Negative Electrode

A negative electrode was manufactured in the same manner as Example 5, except that the composition was prepared as follows.

The silicon-based alloy as the active material, Ketjen black as the conductive material, and PAI as the binder were loaded into a Thinky mixer at a weight ratio of 88:4:8, followed by 30 minutes of dry mixing. Then, NMP was added thereto and mixed to complete the preparation of the composition.

The amount of NMP included in the composition was controlled such that the total solids content of the composition was 48 wt %.

Manufacture Example 1: Manufacture of Coin Cell

A CR-2016 standard coin cell was manufactured using the negative electrode prepared according to Example 1, lithium metal as a reference electrode, a polypropylene separator (Cellgard 3510), and an electrolyte in which 1.3M $LiPF_6$ was dissolved in a mixture including ethylene carbonate (EC) and diethyl carbonate (DEC)(at a weight ratio of 3:7).

Manufacture Example 2: Manufacture of Coin Cells

A coin cell was manufactured in the same manner as Manufacture Example 1, except that the negative electrode prepared according to Example 2 was used instead of the negative electrode prepared according to Example 1.

Manufacture Example 3: Manufacture of Coin Cells

A coin cell was manufactured in the same manner as Manufacture Example 1, except that the negative electrode prepared according to Example 3 was used instead of the negative electrode prepared according to Example 1.

Manufacture Example 4: Manufacture of Coin Cells

A coin cell was manufactured in the same manner as Manufacture Example 1, except that the negative electrode prepared according to Example 4 was used instead of the negative electrode prepared according to Example 1.

Manufacture Example 5: Manufacture of Coin Cells

A coin cell was manufactured in the same manner as Manufacture Example 1, except that the negative electrode prepared according to Example 5 was used instead of the negative electrode prepared according to Example 1.

Comparative Manufacture Example 1: Manufacture of Coin Cells

A coin cell was manufactured in the same manner as Manufacture Example 1, except that the negative electrode prepared according to Comparative Example 1 was used instead of the negative electrode prepared according to Example 1.

Comparative Manufacture Example 2: Manufacture of Coin Cells

A coin cell was manufactured in the same manner as Manufacture Example 1, except that the negative electrode prepared according to Comparative Example 2 was used instead of the negative electrode prepared according to Example 1.

Comparative Manufacture Example 3: Manufacture of Coin Cells

A coin cell was manufactured in the same manner as Manufacture Example 1, except that the negative electrode prepared according to Comparative Example 3 was used instead of the negative electrode prepared according to Example 1.

Comparative Manufacture Example 4: Manufacture of Coin Cells

A coin cell was manufactured in the same manner as Manufacture Example 1, except that the negative electrode prepared according to Comparative Example 4 was used instead of the negative electrode prepared according to Example 1.

Comparative Manufacture Example 5: Manufacture of Coin Cells

A coin cell was manufactured in the same manner as Manufacture Example 1, except that the negative electrode prepared according to Comparative Example 5 was used instead of the negative electrode prepared according to Example 1.

Comparative Manufacture Example 6: Manufacture of Coin Cells

A coin cell was manufactured in the same manner as Manufacture Example 1, except that the negative electrode prepared according to Comparative Example 6 was used instead of the negative electrode prepared according to Example 1.

Evaluation Example 1: Scanning Electron Microscope Analysis

Figure 3:
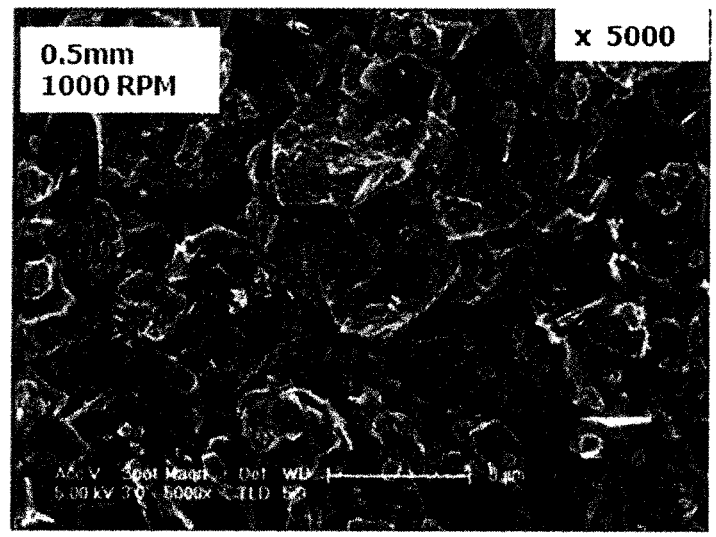
FIG. 3 is an scanning electron microscope (SEM) image of a negative electrode manufactured using the composition for forming a negative active material layer prepared according to Example 1.
Figure 4:
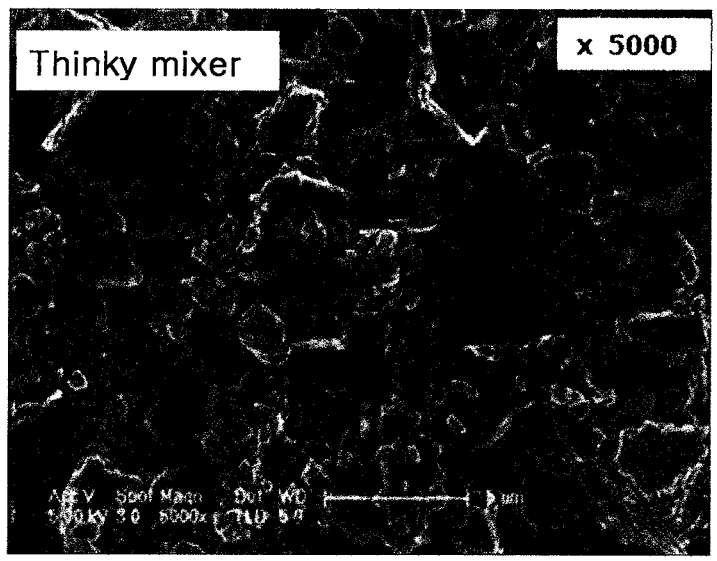
FIG. 4 is a SEM image of a negative electrode manufactured using the composition for forming a negative active material layer prepared according to Comparative Example 2.

The negative electrodes manufactured according to Example 1 and Comparative Example 2 were analyzed using an scanning electron microscope (SEM), and the results thereof are shown in FIGS. 3 and 4. The negative electrodes analyzed by the SEM were not yet pressed following the coating and drying of the compositions on the current collectors.

Referring to FIG. 4, it was confirmed that the active material in the electrode of Comparative Example 2 was pulverized into too small particles. On the other hand, referring to FIG. 3, it was confirmed that the active material in the electrode of Example 1 was not pulverized into too small particles due to the wet mixing and milling process using the bead mill.

Evaluation Example 2: Surface Roughness of Negative Electrode

Surface roughness and roughness deviation of the surfaces of the negative electrodes of Example 1-5 and Comparative Examples 1-6 are shown in Table 1 below.

The surface roughness of the negative electrode is the surface roughness after pressing. The surface roughness was measured as follows.

The negative electrodes of Example 1-5 and Comparative Examples 1-6 were cut to a sample size, and the samples were scanned (scan interval: about 2.5 mm, and scan range: about 25 mm) 9 times using a non-contact laser surface analyzer (usurf custom manufactured by NanoFocus AG Company) to obtain surface roughness mean values and roughness deviation values. The surface roughness mean values and the roughness deviation mean values were used as the surface roughness values and the roughness deviation values, respectively.

TABLE 1

|  | Surface roughness (μm) | Roughness deviation (μm) |
| --- | --- | --- |
| Example 1 | 8.89 | 1.85 |
| Example 2 | 9.93 | 1.09 |
| Example 3 | 10.00 | 1.09 |
| Example 4 | 9.74 | 1.41 |
| Example 5 | 1.00 | 0.26 |
| Comparative Example 1 | 13.20 | 3.23 |
| Comparative Example 2 | 12.10 | 4.33 |
| Comparative Example 3 | 14.23 | 5.65 |
| Comparative Example 4 | 14.93 | 6.04 |
| Comparative Example 5 | 14.68 | 1.72 |
| Comparative Example 6 | 18.43 | 4.05 |

Referring to Table 1, it was confirmed that the negative electrodes of Examples 1-5 had lower and more uniform surface roughness than the negative electrodes of Comparative Examples 1-6.

Evaluation Example 3: Mixed Density and Current Density of Negative Electrode

The mixed density and current density of the negative electrodes of Example 1 and Comparative Examples 1-4 were measured, and the results thereof are shown in Table 2 below.

Mixed Density

Mixed density was measured by dividing the weight of the negative electrode components other than the current collector (i.e., active material, conductive material, binder, etc.) by the volume of the electrode.

TABLE 2

|  | Active material loading amount (mg/cm$^2$) | Mixed density (g/cc) | Current density (mA/cm$^2$) |
| --- | --- | --- | --- |
| Example 1 | 2.87 | 0.85 | 3.14 |
| Comparative Example 1 | 3.06 | 0.93 | 2.85 |
| Comparative Example 2 | 3.55 | 0.91 | 2.84 |
| Comparative Example 3 | 3.14 | 0.97 | 2.85 |
| Comparative Example 4 | 3.95 | 0.94 | 2.85 |

Referring to Table 2, it was confirmed that the negative electrode of Example 1 had a higher current density than the negative electrodes of Comparative Examples 1-4.

Figure 5:
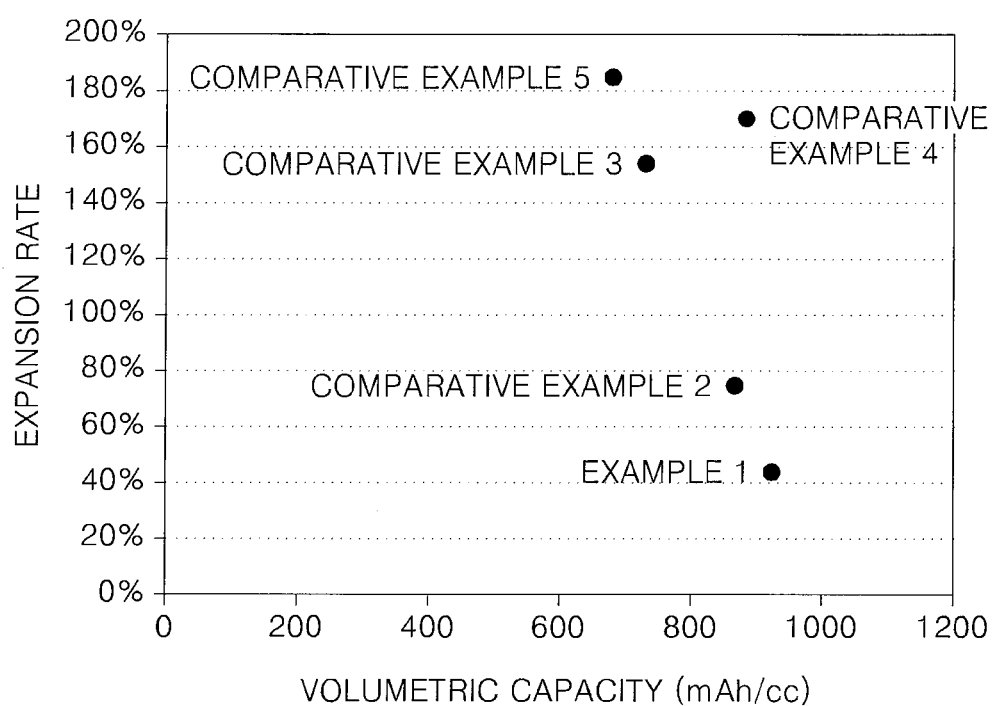
FIG. 5 is a graph comparing the expansion ratio with respect to volumetric capacity of the electrodes manufactured according to Example 1 and Comparative Examples 1-4.

Evaluation Example 4. Volumetric Capacity and Expansion Ratio of Negative Electrode The volumetric capacity, expansion ratio, and volumetric capacity in consideration of expansion of the negative electrodes of Example 1 and Comparative Examples 1-4 were measured, and the results thereof are shown in FIG. 5 and Table 3 below. The volumetric capacity, the expansion ratio, and the volumetric capacity in consideration of expansion were evaluated as follows.

(1) Volumetric Capacity

Volumetric capacity was measured according to Equation 1 below.

Volumetric capacity={(ratio of negative active material to negative active material composition)× expected capacity (mAh/g)×mixed density (g/cc)}  Equation 1

(2) Expansion Ratio

The coin cells manufactured according to Manufacture Example 1 and Comparative Manufacture Examples 1-4 (including the negative electrodes of Example 1 and Comparative Examples 1-4) were charged at a rate of 0.1 C, and then the coin cells were disassembled in a dry room. The increase in thickness of each of the negative electrodes was measured, and the expansion ratios of the negative electrodes were calculated according to Equation 2 below.

Expansion ratio={negative electrode thickness after expansion/(initial negative electrode thickness}× 100  Equation 2

(3) Volumetric Capacity in Consideration of Expansion

The volumetric capacity and expansion ratio were calculated according to Equation 3 below.

Volumetric capacity in consideration of expansion=volumetric capacity/(1+(expansion ratio×0.01))  Equation 3

TABLE 3

|  | Volumetric capacity (mAh/CC) | Expansion ratio (%) | Volumetric capacity in consideration of expansion (mAh/CC) |
| --- | --- | --- | --- |
| Example 1 | 925 | 44 | 642 |
| Comparative Example 1 | 868 | 75 | 496 |
| Comparative Example 2 | 732 | 154 | 288 |
| Comparative Example 3 | 884 | 170 | 327 |
| Comparative Example 4 | 681 | 185 | 239 |

Referring to Table 3 and FIG. 5, it was confirmed that the negative electrode of Example 1 had a lower expansion ratio and a higher volumetric capacity in consideration of expansion than the negative electrodes of Comparative Examples 1-4.

Evaluation Example 5: Charging and Discharging Test

The initial charge efficiency (I.C.E) and discharge capacity of the coin cells manufactured according to Manufacture Example 1 and Comparative Manufacture Examples 1-4 were measured, and the results thereof are shown in Table 4 below.

First, the coin cells of Manufacture Example 1 and Comparative Manufacture Examples 1-4 were charged and discharged once at 0.1 C to perform a formation process. Thereafter, charging and discharging was performed once at 0.2 C to identify initial charging and discharging characteristics. Then, at 1 C, charging and discharging were repeatedly performed 100 times to identify cycle characteristics. Charging was set such that charging began in a constant current (CC) mode, and then the mode was changed into a constant voltage (CV) mode, and cut-off occurred at 0.01 C. Discharging was set such that cut-off occurred at 1.5V in the CC mode.

(1) Initial Charging and Discharging Efficiency

The initial charging and discharging efficiency was calculated according to Equation 4 below.

Initial charging and discharging efficiency [%]=[$1^{st}$ cycle discharge capacity/$1^{st}$ cycle charge capacity]×100   Equation 4

(2) Discharge Capacity

The discharge capacity after charging in the first cycle and the discharge capacity after charging in the second cycle were measured.

TABLE 4

|  | I.C.E (%) | discharge capacity (mAh/g) | |
| --- | --- | --- | --- |
|  |  | 1st cycle | $2^{nd}$ cycle |
| Manufacture Example 1 | 87.0 | 1274 | 1288 |
| Comparative Manufacture Example 1 | 81.9 | 997 | 1009 |
| Comparative Manufacture Example 2 | 75.3 | 930 | 900 |
| Comparative Manufacture Example 3 | 82.3 | 1119 | 1100 |
| Comparative Manufacture Example 4 | 69.3 | 845 | 840 |

Referring to Table 4, it was confirmed that the lithium secondary battery of Manufacture Example 1 had improved I.C.E. and discharge capacity compared to the lithium secondary batteries of Comparative Manufacture Examples 1-4.

Evaluation Example 6: Cycle Lifespan

First, the coin cells of Manufacture Example 1 and Comparative Manufacture Examples 1, 2, 3, and 5 were charged and discharged once at 0.1 C to perform a formation process. Thereafter, charging and discharging was performed once at 0.2 C to identify initial charging and discharging characteristics. Then, at 1 C, charging and discharging were repeatedly performed 100 times to identify cycle characteristics. Charging was set such that charging began in a constant current (CC) mode and then the mode was changed into a constant voltage (CV) mode, and cut-off occurred at 0.01 C. Discharging was set such that cut-off occurred at 1.5V in the CC mode.

Figure 6:
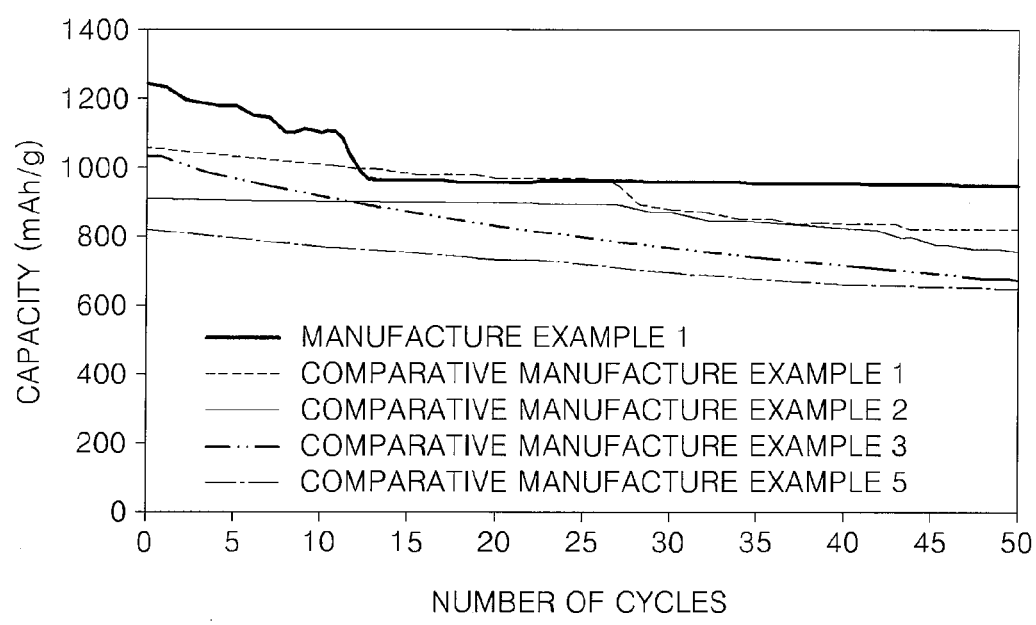
FIG. 6 is a graph comparing the cycle characteristics of the coin cells manufactured according to Manufacture Example 1 and Comparative Manufacture Examples 1, 2, 3, and 5.

The discharge capacity change with respect to cycle was evaluated, and the evaluation results are shown in FIG. 6.

Referring to FIG. 6, it was confirmed that the lithium secondary battery of Manufacture Example 1 had better cycle lifespan characteristics than the lithium secondary batteries of Comparative Manufacture Examples 1, 2, 3 and 5.

Evaluation Example 7: Lifespan Characteristics

First, the coin cells of Manufacture Examples 2, 4, 5 and Comparative Manufacture Examples 2, 5 and 6 were charged and discharged once at 0.1 C to perform a formation process. Thereafter, charging and discharging was performed once at 0.2 C to identify initial charging and discharging characteristics. Then, at 1 C, charging and discharging were repeatedly performed 100 times to identify cycle characteristics. Charging was set such that charging began in a constant current (CC) mode, and then the mode was changed into a constant voltage (CV) mode, and cut-off occurred at 0.01 C. Discharging was set such that cut-off occurred at 1.5V in the CC mode.

The capacity retention rate in the $100^{th}$ cycle is represented by Equation 5 below, and the calculation results are shown in Table 5.

Capacity retention rate in $100^{th}$ cycle [%]=[discharge capacity in $100^{th}$ cycle/discharge capacity in $1^{st}$ cycle]×100   Equation 5

TABLE 5

|  | Capacity retention rate (%) |
| --- | --- |
| Manufacture Example 2 | 90.8 |
| Manufacture Example 4 | 87.1 |
| Manufacture Example 5 | 86.9 |
| Comparative Manufacture Example 2 | 76.0 |
| Comparative Manufacture Example 5 | 74.2 |
| Comparative Manufacture Example 6 | 73.4 |

Referring to Table 5, it was confirmed that the coin cells of Manufacture Examples 2, 4 and 5 had higher capacity retention rates than the coin cells of Comparative Manufacture Examples 2, 5, and 6.

While the certain exemplary embodiments of the present invention have been illustrated and described, those of ordinary skill in the art would recognize that various modifications and changes can be made to the described embodiments without departing from the spirit and scope of the present invention, as defined in the appended claims.

What is claimed is:

1. An electrode for a lithium secondary battery, comprising an electrode active material comprising a silicon-based alloy, the electrode having a surface roughness of about 1 to about 10 μm and a surface roughness deviation of about 5 μm or less, the electrode having a mixed density of about 0.80 to about 0.90 g/cc, and the silicon-based alloy comprising an alloy selected from the group consisting of $Si_{68}Al_8Ni_{24}$, $Si_{62}Ti_{20}Ni_{20}$, $Si_{65}Ti_{17.5}Ni_{17.5}$, and $Si_{68}Ti_{16}Ni_{16}$.

2. The electrode of claim 1, wherein the surface roughness deviation is about 2 μm or less.

3. The electrode of claim 1, wherein the electrode active material is a negative electrode active material, and the electrode is a negative electrode.

4. The electrode of claim 3, wherein the electrode active material further comprises a second material selected from the group consisting of carbonaceous materials, lithium metal, lithium alloys, silicon-oxide based materials, and combinations thereof.

5. The electrode of claim 4, wherein an amount of the second material is about 1 to about 99 parts by weight based on 100 parts by weight of the silicon-based alloy and the second material.

6. A lithium secondary battery, comprising:
a first electrode comprising the electrode of claim 1;
a second electrode; and
an electrolyte.

* * * * *